United States Patent
Tazaki

(10) Patent No.: US 6,846,430 B2
(45) Date of Patent: Jan. 25, 2005

(54) REFRIGERATING MACHINE OIL COMPOSITION FOR NATURAL REFRIGERANT

(75) Inventor: Toshinori Tazaki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/168,385

(22) PCT Filed: Dec. 26, 2000

(86) PCT No.: PCT/JP00/09229

§ 371 (c)(1),
(2), (4) Date: Jun. 21, 2002

(87) PCT Pub. No.: WO01/48128

PCT Pub. Date: Jul. 5, 2001

(65) Prior Publication Data

US 2003/0042464 A1 Mar. 6, 2003

(30) Foreign Application Priority Data

Dec. 28, 1999 (JP) .......................... 11-373351

(51) Int. Cl.$^7$ ................................ C09K 5/04
(52) U.S. Cl. ........................................ 252/68
(58) Field of Search .......................... 252/68

(56) References Cited

U.S. PATENT DOCUMENTS

| 5,413,728 A | 5/1995 | Mall et al. |
| 5,595,678 A | 1/1997 | Short et al. |
| 6,189,322 B1 * | 2/2001 | Ishihara et al. ............... 62/114 |
| 6,193,906 B1 | 2/2001 | Kaneko et al. |
| 6,263,683 B1 | 7/2001 | Tazaki |
| 6,267,907 B1 * | 7/2001 | Tolfa et al. .................... 252/68 |
| 6,306,803 B1 | 10/2001 | Tazaki |
| 6,322,719 B2 | 11/2001 | Kaneko et al. |
| 6,354,094 B2 | 3/2002 | Tazaki |

FOREIGN PATENT DOCUMENTS

| DE | 4404804 | 8/1995 |
| JP | 58-103594 | 6/1983 |
| JP | 8-193196 | 7/1996 |
| JP | 10-46169 | 2/1998 |
| JP | 10-147682 | 6/1998 |
| JP | 2000-96074 | 4/2000 |
| WO | 99/58628 | 11/1999 |

\* cited by examiner

*Primary Examiner*—John R. Hardee
(74) *Attorney, Agent, or Firm*—Oblon, Spivak, McClelland, Maier & Neustadt, P.C.

(57) ABSTRACT

This invention describes a refrigerating oil composition for natural substance-based refrigerants which comprises (A) a synthetic oil component comprising a polyether compound having a pour point of −10° C. or lower and (B) a mineral oil component comprising sulfur components, wherein the ratio of amounts by weight of component (A) to component (B) is in the range of 25:75 to 99:1 and the amount of the sulfur components derived from component (B) in the composition is in the range of 5 to 1,000 ppm. The refrigerating oil composition has excellent miscibility with natural substance-based refrigerants and, in particular, with ammonia-based refrigerants, exhibits an improved lubricity and used for industrial refrigerators using natural substance-based refrigerants such as ammonia, propane, butane and carbon dioxide.

11 Claims, 2 Drawing Sheets

REFRIGERATING MACHINE OIL COMPOSITION FOR NATURAL REFRIGERANT

TECHNICAL FIELD

The present invention relates to a refrigerating oil composition for natural substance-based refrigerants and, more particularly, to a refrigerating oil composition which can be used for industrial refrigerators using natural substance-based refrigerants such as ammonia, propane, butane and carbon dioxide.

BACKGROUND ART

In general, refrigerators such as compression-type refrigerators comprising a compressor, a condenser, an expansion valve and an evaporator have a structure in which a mixed fluid of a refrigerant and a lubricating oil is circulated in the closed system. Heretofore, chlorofluorocarbons such as dichlorodifluoromethane (R-12) and chlorodifluoromethane (R-22) have been used as the refrigerant for the compression-type refrigerators and various types of lubricating oils have been produced and used in combination with the refrigerant. However, since there is the anxiety that the chlorofluorocarbons cause environmental pollution such as ozonosphere destruction in stratosphere when these substances are released into the atmosphere, the regulation on the chlorofluoro-carbons is becoming stricter worldwide. Due to this situation, novel refrigerants such as hydrofluorocarbons and fluorocarbons, typical examples of which include 1,1,1,2-tetrafluoroethane (R-134a), are attracting attention. Although there is no anxiety that the hydrofluorocarbons and the fluorocarbons destruct the ozonosphere, there is the fear that these substances might cause global warming due to the longevity of these substances in the atmosphere. Therefore, the use of natural substance-based refrigerants that do not cause the above problems is considered.

Among the natural substance-based refrigerants, ammonia has heretofore been used for industrial refrigerators that require oil agents and refrigerants in great amounts. As the refrigerating oil for such refrigerators, mineral oils have been used. However, since mineral oils and ammonia are not miscible with each other, additional apparatuses such as an apparatus for separation of the oil are indispensable. Therefore, the system becomes great and, moreover, the performance of the system is not sufficiently satisfactory.

In Japanese Patent Application Laid-Open No. Heisei 5(1993)-9483, it is disclosed that polyalkylene glycols which do not have hydroxyl group at any of the ends have excellent miscibility with ammonia and contribute to improvement in the performance to a great extent. It is described in the specification of the above application that additives conventionally used for refrigerating oils such as extreme pressure agents and antioxidants can be used. However, the use of the additives is not shown in the examples.

In Japanese Patent Application Laid-Open No. Heisei 6(1994)-10081, additives advantageously used in combination with ammonia or hydrofluorocarbon refrigerants are disclosed. However, the use of the additives specifically described in the examples is limited to the use in combination with hydrofluorocarbon refrigerants.

In general, since ammonia has a greater reactivity than other refrigerants and exhibits basic property by itself, acidic substances have been considered to be unsuitable for use in combination with ammonia. On the other hand, most of the additives are actually acidic substances. This situation causes insufficient lubrication and the improvement has been desired. The present situation described above is reflected on the fact that the above references have no specific descriptions on the use of combinations of ammonia with conventional additives. It has not been found whether the combinations can be used for practical applications.

The present invention has an object of providing a refrigerating oil composition having excellent miscibility with natural substance-based refrigerants and, in particular, with ammonia-based refrigerants and exhibiting an improved lubricity.

As the result of extensive studies by the present inventors, it was found that the object of the present invention could be effectively achieved when the refrigerating oil composition comprises a synthetic oil component comprising a polyether compound having a specific property and a mineral oil component comprising sulfur in specific relative amounts, and the amount of the sulfur components is in the range of 5 to 1,000 ppm in the composition. The present invention has been completed based on this finding.

DISCLOSURE OF THE INVENTION

The refrigerating oil composition for natural substance-based refrigerants of the present invention has the following aspects:

(I) A refrigerating oil composition for natural substance-based refrigerants which comprises (A) a synthetic oil component comprising a polyether compound having a pour point of −10° C. or lower and (B) a mineral oil component comprising sulfur components, wherein (A): (B) which is a ratio of an amount by weight of component (A) to an amount by weight of component (B) is in a range of 25:75 to 99:1 and an amount of the sulfur components derived from component (B) in the composition is in a range of 5 to 1,000 ppm;

(II) A refrigerating oil composition for natural substance-based refrigerants described in (I), wherein the polyether compound is a polyalkylene glycol compound represented by general formula (1):

$$R^1\text{—O-A-}R^2 \quad (1)$$

wherein $R^1$ and $R^2$ each represent hydrogen atom or an alkyl group having 1 to 4 carbon atoms, one of $R^1$ and $R^2$ represents an alkyl group having 1 to 4 carbon atoms and an other of $R^1$ and $R^2$ represents hydrogen atom; A represents a chain of a homopolymer of propylene oxide or a copolymer of ethylene oxide and propylene oxide; and, when a number of an ethylene oxide unit is represented by m and a number of a propylene oxide unit is represented by n, m and n satisfy following relations: $0 \leq m/n \leq 10$ and $5 \leq m+n \leq 100$;

(III) A refrigerating oil composition for natural substance-based refrigerants described in (I), wherein the polyether compound is a polyvinyl ether compound; and (IV) A refrigerating oil composition for natural substance-based refrigerants described in (I), wherein the natural substance-based refrigerants comprises 90% by weight or more of ammonia.

Figure 1:
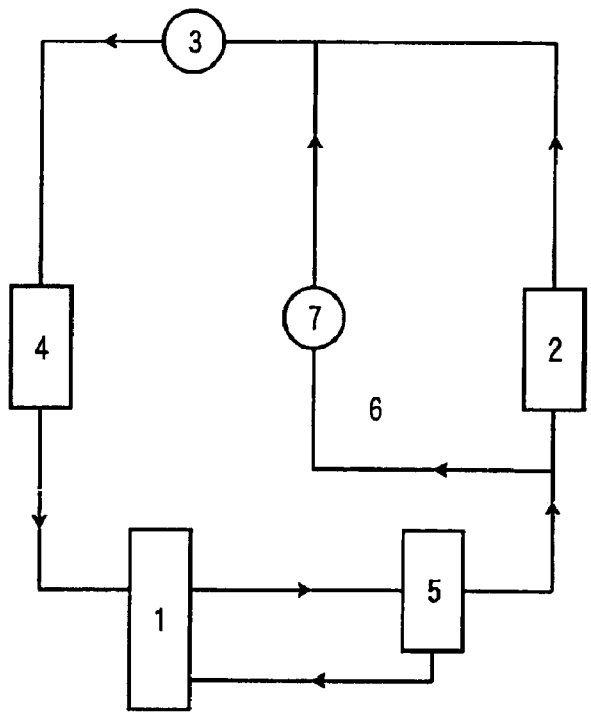
FIG. 1 shows a flow diagram that exhibits an example of the compression type refrigerating cycle of the "compressor—condenser—expansion valve—evaporator" system having an oil separator and a hot gas line.

Descriptions of the numerical symbols in the Figures are as the followings:

1: A compressor
2: A condenser
3: An expansion valve
4: An evaporator
5: An oil separator
6: A hot gas line
7: A valve for a hot gas line

THE MOST PREFERRED EMBODIMENT TO CARRY OUT THE INVENTION

It is necessary that the polyether compound used in the present invention have a pour point of −10° C. or lower. It is preferable that the kinematic viscosity at 100° C. is 3 to 50 mm²/s. It is more preferable that the kinematic viscosity is 3 to 45 mm²/s and the pour point is −15° C. or lower. When the kinematic viscosity is lower than 3 mm²/s, the lubricity is not sufficiently exhibited at high temperatures. When the kinematic viscosity exceeds 50 mm²/s, miscibility with ammonia markedly decreases and power loss increases. Therefore, the anxiety that an efficient operation cannot be completed increases. When the pour point is higher than −10° C., resistance to flow at low temperature increases and efficiency and the lubricities are adversely affected.

The polyether compound used in the present invention is not particularly specified as long as the above requirements are satisfied. Polyalkylene glycol compounds and polyvinyl ether compounds are suitable as the polyether compound. Polyalkylene glycol compounds represented by the foregoing general formula (1) are more suitable as the polyalkylene glycol compound.

In the foregoing general formula (1) representing the polyalkylene glycol compound, $R^1$ and $R^2$ each represent hydrogen atom or an alkyl group having 1 to 4 carbon atoms such as methyl group, ethyl group, n-propyl group, isopropyl group, n-butyl group, sec-butyl group, isobutyl group and tert-butyl group, one of $R^1$ and $R^2$ represents an alkyl group having 1 to 4 carbon atoms and the other of $R^1$ and $R^2$ represents hydrogen atom. The compound may have various copolymer structures such as structures of a block copolymer, a random copolymer and an alternating copolymer. m and n represent numbers satisfying the following relations: $0 \leq m/n \leq 10$, preferably $0 \leq m/n \leq 3$ and more preferably $0 \leq m/n \leq 2$; and $5 \leq m+n \leq 100$ and preferably $5 \leq m+n \leq 50$.

In the present invention, apart from the polyalkylene glycol compound represented by the foregoing general formula (1), a polyalkylene glycol compound of an ethylene oxide-propylene oxide copolymer represented by the following general formula (2):

can also be used as the polyether compounds. In the general formula (2), $R^3$, $R^4$ and $R^5$ each represent hydrogen atom or an alkyl group having 1 to 4 carbon atoms, at least one of $R^3$, $R^4$ and $R^5$ represents an alkyl group having 1 to 4 carbon atoms and A is the same as defined above for general formula (1).

Examples of the alkyl group having 1 to 4 carbon atoms represented by $R^3$, $R^4$ or $R^5$ in the general formula (2) include methyl group, ethyl group, n-propyl group, isopropyl group, n-butyl group, sec-butyl group, isobutyl group and tert-butyl group. At least one of $R^3$, $R^4$ and $R^5$ represents an alkyl group having 1 to 4 carbon atoms. When the value represented by m/n exceeds 10 in general formula (1) or (2) representing the compound used for the refrigerating oil composition of the present invention, a drawback arises in that the compound becomes waxy and the miscibility becomes poor. When the value represented by m+n is smaller than 5, a drawback arise in that the viscosity is excessively small and the lubricity becomes poor. When the value represented by m+n exceeds 100, a drawback arises in that the miscibility and the efficiency of heat exchange become poor due to a high viscosity.

Examples of the polyvinyl ether compound include polyvinyl ether compounds comprising constituting units represented by general formula (3):

wherein $R^5$, $R^6$ and $R^7$ each represent hydrogen atom or a hydrocarbon group having 1 to 8 carbon atoms, the atom and the groups represented by $R^5$, $R^6$ and $R^7$ may be the same with or different from each other, $R^8$ represents a divalent hydrocarbon group having 1 to 10 carbon atoms, $R^9$ represents a hydrocarbon group having 1 to 20 carbon atoms, k represent numbers giving an average value of 0 to 10, the atom and the groups represented by $R^5$ to $R^9$ may be the same or different among different constituting units and, when a plurality of $R^8O$ are present, the plurality of $R^8O$ may represent the same group or different groups.

Polyvinyl ether compounds comprising block or random copolymers comprising the constituting units represented by the foregoing general formula (3) and constituting units represented by the following general formula (4):

can also be used as the polyether compounds. In the general formula (4), $R^{10}$ to $R^{13}$ each represent hydrogen atom or a hydrocarbon group having 1 to 20 carbon atoms and the atom and the groups represented by $R^{10}$ to $R^{13}$ may be the same with or different from each other and may be the same or different among different constituting units.

In the foregoing general formula (3), $R^5$, $R^6$ and $R^7$ each represent hydrogen atom or a hydrocarbon group having 1 to 8 carbon atoms and preferably 1 to 4 carbon atoms. The atom and the groups represented by $R^5$, $R^6$ and $R^7$ may be the same with or different from each other. Examples of the hydrocarbon group include alkyl groups such as methyl group, ethyl group, n-propyl group, isopropyl group, n-butyl group, isobutyl group, sec-butyl group, tert-butyl group, various types of pentyl groups, various types of hexyl groups, various types of heptyl groups and various types of octyl groups; cycloalkyl groups such as cyclopentyl group, cyclohexyl group, various types of methylcyclohexyl groups, various types of ethylcyclohexyl groups and various types of dimethylcyclohexyl groups; aryl groups such as phenyl group, various types of methylphenyl groups, various types of ethylphenyl groups and various types of dimethylphenyl groups; and arylalkyl groups such as benzyl group, various types of phenylethyl groups and various types of methylbenzyl groups. It is preferable that $R^5$, $R^6$ and $R^7$ represent hydrogen atom.

On the other hand, $R^8$ in general formula (3) represents a divalent hydrocarbon group having 1 to 10 carbon atoms and preferably 2 to 10 carbon atoms. Examples of the divalent hydrocarbon group having 1 to 10 carbon atoms include divalent aliphatic groups such as methylene group, ethylene group, phenylethylene group, 1,2-propylene group, 2-phenyl-1,2-propylene group, 1,3-propylene group, various types of butylene groups, various types of pentylene groups, various types of hexylene groups, heptylene groups, various types of octylene groups, various types of nonylene groups and various types of decylene groups; alicyclic groups having two bonding portions on an alicyclic hydrocarbon such as cyclohexane, methyl-cyclohexane, ethylcyclohexane, dimethylcyclohexane and propylcyclohexane; divalent aromatic hydrocarbon groups such as various types of phenylene groups, various types of methylphenylene groups, various ethylphenylene groups, various types of dimethylphenylene groups and various types of naphthylene groups; alkylaromatic groups having one monovalent bonding portion on each of the alkyl portion and the aromatic portion of alkylaromatic hydrocarbons such as toluene, xylene and ethylbenzene; and alkylaromatic hydrocarbon groups having bonding portions on alkyl group portions of polyalkylaromatic hydrocarbons such as xylene and diethylbenzene. Among the above groups, aliphatic groups having 2 to 4 carbon atoms are preferable.

Further, k in general formula (3) represent numbers showing the repeating numbers of the group represented by $R^8O$ and giving an average value in the range of 0 to 10 and preferably in the range of 0 to 5. When a plurality of $R^8O$ are present, the plurality of $R^8O$ may represent the same group or different groups.

Furthermore, $R^9$ in general formula (3) represents a hydrocarbon group having 1 to 20 carbon atoms and preferably 1 to 10 carbon atoms. Examples of the hydrocarbon group represented by $R^9$ include alkyl groups such as methyl group, ethyl group, n-propyl group, isopropyl group, n-butyl group, isobutyl group, sec-butyl group, tert-butyl group, various types of pentyl groups, various types of hexyl groups, various types of heptyl groups, various types of octyl groups, various types of nonyl groups and various types of decyl groups; cycloalkyl groups such as cyclopentyl group, cyclohexyl group, various types of methylcyclohexyl groups, various types of ethylcyclohexyl groups, various types of propylcyclohexyl groups and various types of dimethylcyclohexyl groups; aryl groups such as phenyl group, various types of methylphenyl groups, various types of ethylphenyl groups, various types of dimethylphenyl groups, various types of propylphenyl groups, various types of trimethylphenyl groups, various types of butylphenyl groups and various types of naphthyl groups; and arylalkyl groups such as benzyl group, various types of phenylethyl groups, various types of methylbenzyl groups, various types of phenylpropyl groups and various types of phenylbutyl groups. The atom and the groups represented by $R^5$ to $R^9$ may be the same or different among different constituting units.

It is preferable that polyvinyl ether compound (i) comprising the constituting units represented by the foregoing general formula (3) has a ratio of the number by mole of carbon to the number by mole of oxygen in the range of 4.2 to 7.0. When this ratio is smaller than 4.2, the compound is hygroscopic to a great extent. When the ratio exceeds 7.0, miscibility with the refrigerant occasionally becomes poor.

In the foregoing general formula (4), $R^{10}$ to $R^{13}$ each represent hydrogen atom or a hydrocarbon group having 1 to 20 carbon atoms and the atom and the groups represented by $R^{10}$ to $R^{13}$ may be the same with or different from each other. Examples of the hydrocarbon group having 1 to 20 carbon atoms include the groups described above as the examples of the hydrocarbon group represented by $R^9$ in the foregoing general formula (3). The atom and the groups represented by $R^{10}$ to $R^{13}$ may be the same or different among different constituting units.

It is preferable that polyvinyl ether compound (ii) comprising a block or random copolymer comprising the constituting units represented by general formula (3) and the constituting units represented by general formula (4) has a ratio of the number by mole of carbon to the number by mole of oxygen in the range of 4.2 to 7.0. When this ratio is smaller than 4.2, the compound is hygroscopic to a great extent. When the ratio exceeds 7.0, miscibility with the refrigerant occasionally becomes poor.

In the present invention, a mixture of the polyvinyl ether compound (i) and the polyvinyl ether compound (ii) may also be used. Polyvinyl ether compounds (i) and (ii) used in the present invention can be produced by polymerization of the corresponding vinyl ether monomer and copolymerization of the corresponding hydrocarbon monomer having an olefinic double bond and the corresponding vinyl ether monomer, respectively.

As the polyvinyl ether compound used in the present invention, polyvinyl ether compounds having the following end structures are preferable:

Polyvinyl ether compounds that have one end having the structure represented by general formula (5) or (6):

wherein $R^{14}$, $R^{15}$ and $R^{16}$ each represent hydrogen atom or a hydrocarbon group having 1 to 8 carbon atoms, the atoms and the groups represented by $R^{14}$, $R^{15}$ and $R^{16}$ may be the same with or different from each other, $R^{19}$, $R^{20}$, $R^{21}$ and $R^{22}$ each represent hydrogen atom or a hydrocarbon group having 1 to 20 carbon atom, the atoms and the groups represented by $R^{19}$, $R^{20}$, $R^{21}$ and $R^{22}$ may be the same with or different from each other, $R^{17}$ represents a divalent hydrocarbon group having 1 to 10 carbon atoms, $R^{18}$ represents a hydrocarbon group having 1 to 20 carbon atoms, p represent numbers giving an average value of 0 to 10 and, when a plurality of $R^{17}O$ are present, the plurality of $R^{17}O$ may represent the same group or different groups, and the other end having the structure represented by general formula (7) or (8):

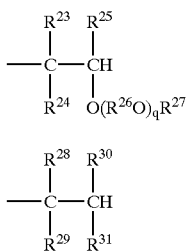

wherein $R^{23}$, $R^{24}$ and $R^{25}$ each represent hydrogen atom or a hydrocarbon group having 1 to 8 carbon atoms, the atoms and the groups represented by $R^{23}$, $R^{24}$ and $R^{25}$ may be the same with or different from each other, $R^{28}$, $R^{29}$, $R^{30}$ and $R^{31}$ each represent hydrogen atom or a hydrocarbon group having 1 to 20 carbon atom, the atoms and the groups represented by $R^{28}$, $R^{29}$, $R^{30}$ and $R^{31}$ may be the same with or different from each other, $R^{26}$ represents a divalent hydrocarbon group having 1 to 10 carbon atoms, $R^{27}$ represents a hydrocarbon group having 1 to 20 carbon atoms, q represent numbers giving an average value of 0 to 10 and, when a plurality of $R^{26}O$ are present, the plurality of $R^{26}O$ may represent the same group or different groups; and Polyvinyl ether compounds which have one end having the structure represented by the foregoing general formula (5) or (6) and the other end having the structure represented by general formula (9):

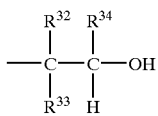

wherein $R^{32}$, $R^{33}$ and $R^{34}$ each represent hydrogen atom or a hydrocarbon group having 1 to 8 carbon atoms and the atoms and the groups represented by $R^{32}$, $R^{33}$ and $R^{34}$ may be the same with or different from each other.

Among the above polyvinyl ether compounds, the following compounds are preferably used in the present invention:

(a) Compounds which have one end having the structure represented by general formula (5) or (6) and the other end having the structure represented by general formula (7) or (8) and comprise the structural units represented by general formula (3) in which $R^5$, $R^6$ and $R^7$ each represent hydrogen atoms, k represent numbers of 0 to 4, $R^8$ represents a divalent hydrocarbon group having 2 to 4 carbon atoms and $R^9$ represents a hydrocarbon group having 1 to 20 carbon atoms;

(b) Compounds which comprise the structural units represented by general formula (3) alone and have one end having the structure represented by general formula (5) or (6) and the other end having the structure represented by general formula (7), wherein $R^5$, $R^6$ and $R^7$ in general formula (3) each represent hydrogen atom, k represent numbers of 0 to 4, $R^8$ represents a divalent hydrocarbon group having 2 to 4 carbon atoms and $R^9$ represents a hydrocarbon group having 1 to 20 carbon atoms;

(c) Compounds which have one end having the structure represented by general formula (5) or (6) and the other end having the structure represented by general formula (9) and comprise the structural units represented by general formula (3) in which $R^5$, $R^6$ and $R^7$ each represent hydrogen atom, k represent numbers of 0 to 4, $R^8$ represents a divalent hydrocarbon group having 2 to 4 carbon atoms and $R^9$ represents a hydrocarbon group having 1 to 20 carbon atoms; and (d) Compounds which comprise the structural units represented by general formula (3) alone and have one end having the structure represented by general formula (5) and the other end having the structure represented by general formula (8), wherein $R^5$, $R^6$ and $R^7$ in general formula (3) each represent hydrogen atom, k represent numbers of 0 to 4, $R^8$ represents a divalent hydrocarbon group having 2 to 4 carbon atoms and $R^9$ represents a hydrocarbon group having 1 to 20 carbon atoms.

In the present invention, polyvinyl ether compounds which comprise the structural unit represented by the foregoing general formula (3) and have one end having the structure represented by the foregoing general formula (5) and the other end having the structure represented by the following general formula (10):

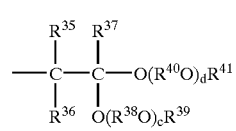

can also be used. In general formula (10) $R^{35}$, $R^{36}$ and $R^{37}$ each represent hydrogen atom or a hydrocarbon group having 1 to 8 carbon atoms and the atoms and the groups represented by $R^{35}$, $R^{36}$ and $R^{37}$ may be the same with or different from each other; $R^{38}$ and $R^{40}$ each represent a divalent hydrocarbon group having 2 to 10 carbon atoms and may represent the same group or different groups; $R^{39}$ and $R^{41}$ each represent a hydrocarbon group having 1 to 10 carbon atoms and may represent the same group or different groups; c and d each represent numbers giving an average value of 0 to 10 and may represent the same number or different numbers; when a plurality of $R^{38}O$ are present, the plurality of $R^{38}O$ may represent the same group or different groups; and, when a plurality of $R^{40}O$ are present, the plurality of $R^{40}O$ represent the same group or different groups.

Further, examples of the polyvinyl ether compounds which can be used in the present invention include homopolymers or copolymers of alkyl vinyl ethers comprising structural units represented by general formula (11) or (12):

$$\begin{array}{c} OR^{42} \\ | \\ -(CH_2CH)- \end{array} \qquad (11)$$

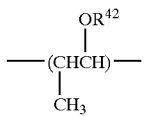

(12)

wherein $R^{42}$ represents a hydrocarbon group having 1 to 8 carbon atoms, and having a weight-average molecular weight of 300 to 5,000 and one end having the structure represented by general formula (13) or (14):

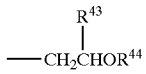

(13)

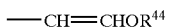

(14)

wherein $R^{43}$ represents an alkyl group having 1 to 3 carbon atoms and $R^{44}$ represents a hydrocarbon group having 1 to 8 carbon atoms.

Furthermore, examples of the polyvinyl ether compound described above include the compounds described in detail in Japanese Patent Application Laid-Open No. Heisei 6(1994)-128578 and Japanese Patent Application Nos. Heisei 5(1993)-125649, Heisei 5(1993)-125650 and Heisei 5(1993)-303736.

The mineral oil component used in the present invention is not particularly specified. Examples of the mineral oil component include distilled oils obtained by atmospheric distillation of paraffinic crude oils, intermediate crude oils and naphthenic crude oils, distilled oils obtained by vacuum distillation of residual oils of the atmospheric distillation and purified oils obtained by purifying the above oils in accordance with a conventional process such as oils purified with solvents, oils purified by hydrogenation, oils treated by dewaxing and oils treated with white clay. It is suitable that the mineral oil component has a pour point of $-5°$ C. or lower and a content of sulfur of 0.01 to 5.00% by weight. When the pour point is higher than $-5°$ C., the pour point of the refrigerating oil composition obtained by mixing with the polyether compound is elevated and there is the possibility that fluidity becomes poor. When the content of sulfur is outside the above range, there is the anxiety that the effect of addition is not exhibited or stability deteriorates to cause formation of sludge.

It is necessary that (A):(B), the ratio of the amount by weight of component (A) comprising the polyether compound to the amount by weight of component (B) comprising the sulfur component, is in the range of 25:75 to 99:1. When the ratio is less than the aforementioned range, the sufficient properties cannot be exhibited due to decreases in fluidity at low temperatures and miscibility with ammonia. When the ratio exceeds the aforementioned range, the effect of addition of the mineral oil component cannot be expected. It is preferable that the ratio is in the range of from 25:75 to 75:25.

It is necessary that the refrigerating oil composition of the present invention comprise sulfur components derived from the mineral component in an amount of 5 to 1,000 ppm and preferably 50 to 500 ppm. Therefore, the amount of the used mineral oil component is adjusted in accordance with the content of the sulfur components in the mineral oil component so that the content of sulfur in the refrigerating oil composition is adjusted in the above range. When the content of the sulfur components in the refrigerating oil composition is less than 5 ppm, the expected effect of the addition to provide the lubricity is not exhibited. When the content of the sulfur components exceeds 1,000 ppm, the stability deteriorates and the fear of formation of sludge increases. To the refrigerating oil composition for natural substance-based refrigerants of the present invention, where necessary, extreme pressure agents, acid catchers, antioxidants and anticorrosion agents are added.

In the present invention, the natural substance-based refrigerant means ammonia, propane, butane, carbon dioxide or the like substance. The lubricating oil composition of the present invention is effective, in particular, for ammonia-based refrigerants, i.e., refrigerating systems containing 90% by weight or more of ammonia. The lubricating oil composition of the present invention is also effective for other natural substance-based refrigerating systems. In the process for lubricating refrigerators using the refrigerating oil composition of the present invention, it is preferable that the ratio of the amount by weight of the above natural substance-based refrigerant to the amount by weight of the above refrigerating oil composition is in the range of 99/1 to 10/90. When the amount of the refrigerant is less than the above range, the refrigerating ability becomes poor. When the amount of the refrigerant exceeds the above range, the lubricity deteriorates. Therefore, amounts outside the above range are not preferable. From the above standpoint, it is more preferable that the ratio of the amount by weight of the refrigerant to the amount by weight of the refrigerating oil composition is in the range of 95/5 to 30/70.

Figure 2:
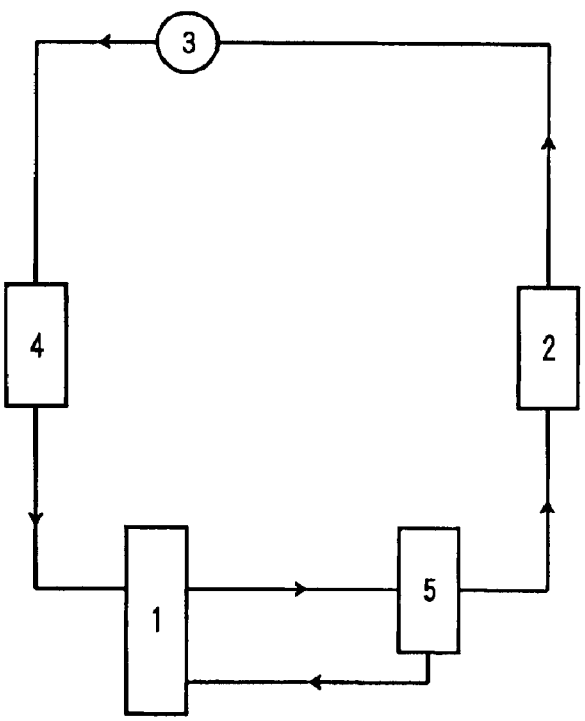
FIG. 2 shows a flow diagram that exhibits an example of the compression type refrigerating cycle of the "compressor—condenser—expansion valve—evaporator" system having an oil separator.
Figure 3:
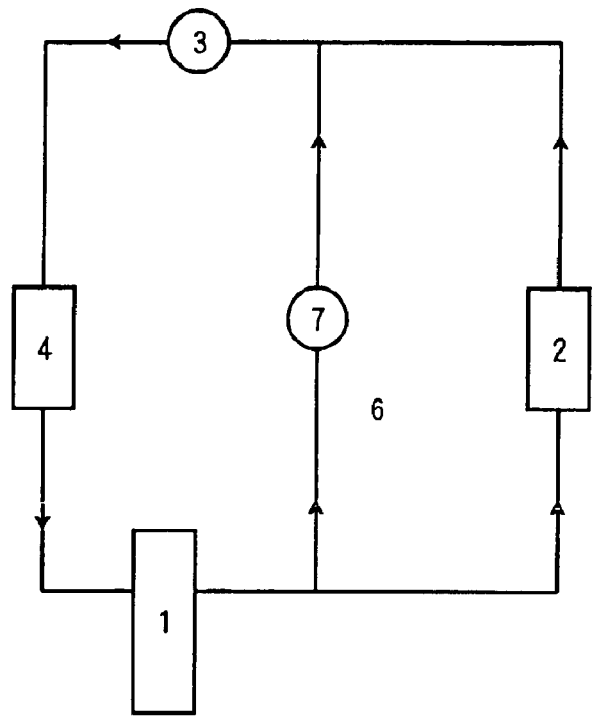
FIG. 3 shows a flow diagram that exhibits an example of the compression type refrigerating cycle of the "compressor—condenser—expansion valve—evaporator" system having a hot gas line.
Figure 4:
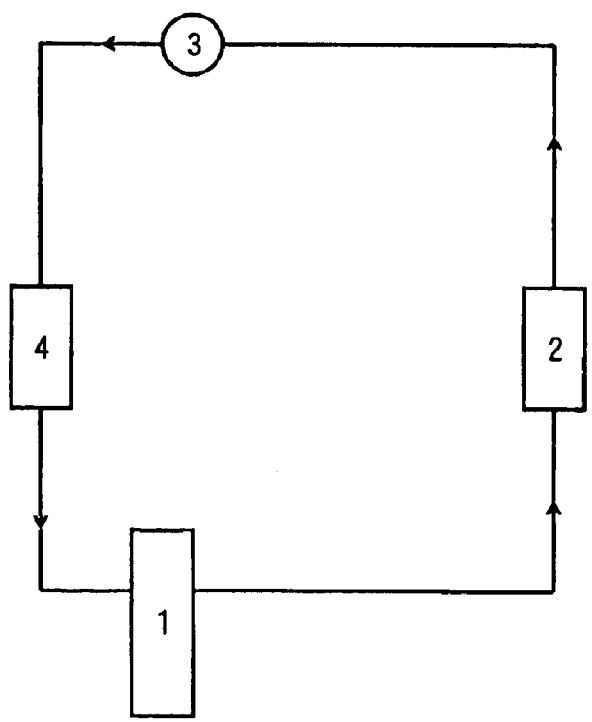
FIG. 4 shows a flow diagram which exhibits an example of the compression type refrigerating cycle of the "compressor—condenser—expansion valve—evaporator" system.

The refrigerating oil composition of the present invention can be applied to various types of refrigerators. In particular, the refrigerating oil composition of the present invention is advantageously applied to compression-type refrigerating cycles in industrial compression-type refrigerators in which the oil agents and the refrigerant are required in great amounts. For example, the refrigerating oil composition can be advantageously applied to refrigerators disclosed in Japanese Patent Application Laid-Open Nos. Heisei 4(1992)-183788, Heisei 8(1996)-259975, Heisei 8(1996)-240362, Heisei 8(1996)-253779, Heisei 8(1996)-240352, Heisei 5(1993)-17792, Heisei 8(1996)-226717 and Heisei 8(1996)-231972. For example, the advantageous effects can be exhibited when the refrigerating oil composition of the present invention is applied to compression-type refrigerating cycles having an oil separator and/or a hot gas line such as the refrigerating cycles shown in FIGS. 1 to 3.

EXAMPLE

The present invention will be described below in further details with reference to the following examples.

The test methods used in the examples were as follows.
[Stability]
Into an autoclave having an inner volume of 20 ml, 7 g of a sample oil, 3 g of a refrigerant of ammonia gas and a metal catalyst containing copper, aluminum and iron were placed and water was added to the system in an amount such that the content of water was adjusted to 1,000 ppm. After the autoclave was closed and kept at 150° C. for 14 days, the sample oil was analyzed.
[Load of Seizure]
The load of seizure was measured in accordance with the method of ASTM D-3233 with a rotation speed of 290 rpm at the room temperature.

Examples 1 to 5 and Comparative Examples 1 to 5

The test of stability and the measurement of the load of seizure were conducted using the refrigerating oil compositions shown in Table 1. The results are shown in Table 2.

Components (A) and (B) are abbreviated as follows in Table 1.

Component (A) (The synthetic oil component)

PAG-1; Polyoxypropylene glycol dimethyl ether

PAG-2: Polyoxyethylene(10)oxypropylene(90) glycol mono(n-butyl) ether

PAG-3: Polyoxyethylene(20)oxypropylene(80) glycol monoethyl ether

PVE-1: A copolymer of polyethyl vinyl ether (90) and polyisobutyl vinyl ether (10)

PVE-2: A copolymer of polyethyl vinyl ether (70) and polyisobutyl vinyl ether (30)

Component (B) (The mineral oil component)

The kinematic viscosity at 40° C.: 11.6 mm²/s

The kinematic viscosity at 100° C.: 2.84 mm²/s

The content of sulfur: 0.06%

The pour point: −45° C.

TABLE 1

| | Component (A) | | | | Composition | | |
|---|---|---|---|---|---|---|---|
| | type | kinematic viscosity at 100° C. (mm²/s) | pour point (° C.) | composition | Component (B) composition | kinematic viscosity at 40° C. (mm²/s) | content of sulfur (ppm) |
| Example 1 | PAG-1 | 17.8 | −50> | 74 | 26 | 49.5 | 153 |
| Example 2 | PAG-2 | 20.8 | −50> | 58 | 42 | 38.3 | 255 |
| Example 3 | PAG-3 | 25.1 | −50> | 46 | 54 | 31.4 | 322 |
| Example 4 | PVE-1 | 12.5 | −50> | 36 | 64 | 22.4 | 395 |
| Example 5 | PVE-2 | 11.4 | −50> | 53 | 47 | 32.4 | 283 |
| Comparative Example 1 | PAG-1 | 17.8 | −50> | 100 | 0 | 99.4 | 5> |
| Comparative Example 2 | PAG-2 | 20.8 | −50> | 100 | 0 | 129.8 | 5> |
| Comparative Example 3 | PAG-3 | 25.1 | −50> | 100 | 0 | 160.0 | 5> |
| Comparative Example 4 | PVE-1 | 12.5 | −50> | 100 | 0 | 130.0 | 5> |
| Comparative Example 5 | PVE-2 | 11.4 | −50> | 100 | 0 | 113.3 | 5> | composition: the ratio of the amount by weight of Component (A) to the amount by weight of Component (B)

TABLE 2

| | Stability | | | | |
|---|---|---|---|---|---|
| | appearance of oil | precipitates | metal catalyst | total acid value after test (mgKOH/g) | Load of seizure (N) |
| Example 1 | good | none | no change | 0.01 | 3560 |
| Example 2 | good | none | no change | 0.01 | 3770 |
| Example 3 | good | none | no change | 0.01 | 3650 |
| Example 4 | good | none | no change | 0.01 | 3420 |
| Example 5 | good | none | no change | 0.01 | 3370 |
| Comparative Example 1 | good | none | no change | 0.01 | 2890 |
| Comparative Example 2 | good | none | no change | 0.01 | 3060 |
| Comparative Example 3 | good | none | no change | 0.01 | 2960 |
| Comparative Example 4 | good | none | no change | 0.01 | 2670 |
| Comparative Example 5 | good | none | no change | 0.01 | 2550 |

INDUSTRIAL APPLICABILITY

In the present invention, the mineral oil component containing sulfur is added to the synthetic oil component comprising the polyether compound having the specific properties so that the refrigerating oil contains sulfur derived from the mineral oil in a specific relative amount. The lubricity can be improved without adverse effects on compatibility of the polyether compound with natural substance-based refrigerants and, in particular, with ammonia-based refrigerants.

What is claimed is:

1. A refrigerating oil composition comprising (A) a synthetic oil component having a pour point of −10° C. or lower comprising one or more polyalkene glycol compounds represented by formula (1):

$$R^1\text{—O-A-}R^2 \tag{1}$$

wherein one of $R^1$ or $R^2$ is a hydrogen atom and the other one of $R^1$ or $R^2$ is an alkyl group having 1 to 4 carbon atoms, A is a homopolymer of propylene oxide or a copolymer of ethylene oxide and propylene oxide having a number of ethylene oxide units of m and a number of a propylene oxide units of n, wherein m and n satisfy the following relations:

$$0 \leq m/n \leq 10, \text{ and}$$

$$5 \leq 23 \ m+n \leq 100;$$

(B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) ammonia.

2. A refrigerating oil composition comprising (A) a synthetic oil component having a pour point of −10° C. or lower comprising one or more polyalkene glycol compounds represented by formula (1):

$$R^1\text{—O-A-}R^2 \tag{1}$$

wherein one of $R^1$ or $R^2$ is a hydrogen atom and the other one of $R^1$ or $R^2$ is an alkyl group having 1 to 4 carbon atoms, A is a copolymer of ethylene oxide and propylene oxide having a number of ethylene oxide units of m and a number of a propylene oxide units of n, wherein m and n satisfy the following relations:

$0 \leq m/n \leq 3$, and $5 \leq m+n \leq 100$;

(B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) at least one compound selected from the group consisting of ammonia, propane, butane and carbon dioxide.

3. A refrigerating oil composition comprising (A) a synthetic oil component having a pour point of −10° C. or lower comprising one or more polyalkene glycol compounds represented by formula (1):

$R^1\text{—O-A-}R^2$      (1)

wherein one of $R^1$ or $R^2$ is a hydrogen atom and the other one of $R^1$ or $R^2$ is an alkyl group having 1 to 4 carbon atoms, A is a copolymer of ethylene oxide and propylene oxide having a number of ethylene oxide units of m and a number of a propylene oxide units of n, wherein m and n satisfy the following relations:

$0 \leq m/n \leq 2$, and $5 \leq m+n \leq 50$;

(B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) at least one compound selected from the group consisting of ammonia, propane, butane and carbon dioxide.

4. A refrigerating oil composition comprising: (A) polyoxyethylene(10) oxypropylene(90) glycol mono(n-butyl)ether; (B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) at least one compound selected from the group consisting of ammonia, propane, butane and carbon dioxide.

5. A refrigerating oil composition comprising (A) polyoxyethylene(20) oxypropylene(80) glycol monoethyl ether; (B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) at least one compound selected from the group consisting of ammonia, propane, butane and carbon dioxide.

6. A refrigerating oil composition comprising (A) a copolymer of polyethylvinylether(90) and polyisobutylvinylether(10); (B) a purified mineral oil component comprising one or more sulfur components; and (C) at least one compound selected from the group consisting of ammonia, propane, butane and carbon dioxide;

wherein the weight ratio (A):(B) is from 25:75 to 99:1, and the amount of the sulfur components derived from component (B) in the composition is in a range of 5 to 1,000 ppm.

7. A refrigerating oil composition comprising (A) a copolymer of polyethylvinylether(70) and polyisobutylvinylether(30); (B) a purified mineral oil component comprising one or more sulfur components; and (C) at least one compound selected from the group consisting of ammonia, propane, butane and carbon dioxide;

wherein the weight ratio (A):(B) is from 25:75 to 99:1, and the amount of the sulfur components derived from component (B) in the composition is in a range of 5 to 1,000 ppm.

8. A refrigerating oil composition comprising (A) a synthetic oil component having a pour point of −10° C. or lower comprising one or more polyalkene glycol compounds represented by formula (1):

$R^1\text{—O-A-}R^2$      (1)

wherein one of $R^1$ or $R^2$ is a hydrogen atom and the other one of $R^1$ or $R^2$ is an alkyl group having 1 to 4 carbon atoms, A is a homopolymer of propylene oxide or a copolymer of ethylene oxide and propylene oxide having a number of ethylene oxide units of m and a number of a propylene oxide units of n, wherein m and n satisfy the following relations:

$0 \leq m/n \leq 10$, and $5 \leq m+n \leq 100$;

(B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) propane.

9. A refrigerating oil composition comprising (A) a synthetic oil component having a pour point of −10° C. or lower comprising one or more polyalkene glycol compounds represented by formula (1):

$R^1\text{—O-A-}R^2$      (1)

wherein one of $R^1$ or $R^2$ is a hydrogen atom and the other one of $R^1$ or $R^2$ is an alkyl group having 1 to 4 carbon atoms, A is a homopolymer of propylene oxide or a copolymer of ethylene oxide and propylene oxide having a number of ethylene oxide units of m and a number of a propylene oxide units of n, wherein m and n satisfy the following relations:

$0 \leq m/n \leq 10$, and $5 \leq m+n \leq 100$;

(B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) butane.

10. A refrigerating oil composition comprising (A) a synthetic oil component having a pour point of −10° C. or lower comprising one or more polyalkene glycol compounds represented by formula (1):

$R^1\text{—O-A-}R^2$      (1)

wherein one of $R^1$ or $R^2$ is a hydrogen atom and the other one of $R^1$ or $R^2$ is an alkyl group having 1 to 4 carbon atoms, A is a copolymer of ethylene oxide and propylene oxide having a number of ethylene oxide units of m and a number of a propylene oxide units of n, wherein m and n satisfy the following relations:

$0 \leq m/n \leq 10$, and $5 \leq m+n \leq 100$;

(B) a purified mineral oil component comprising one or more sulfur components, wherein the weight ratio (A):(B) is in a range of 25:75 to 99:1 and an amount of the sulfur components derived from component (B) in the composition is in a range of 5 to 1,000 ppm; and (C) at least one compound selected from the group consisting of ammonia, propane, butane and carbon dioxide.

11. A refrigerating oil composition comprising (A) one or more polyvinyl ether compounds; (B) a purified mineral oil component comprising one or more sulfur components; and (C) ammonia;

wherein the weight ratio (A):(B) is from 25:75 to 99:1, and the amount of the sulfur components derived from component (B) in the composition is in a range of 5 to 1,000 ppm.

* * * * *

UNITED STATES PATENT AND TRADEMARK OFFICE
CERTIFICATE OF CORRECTION

PATENT NO. : 6,846,430 B2 Page 1 of 1
APPLICATION NO. : 10/168385
DATED : January 25, 2005
INVENTOR(S) : Toshinori Tazaki It is certified that error appears in the above-identified patent and that said Letters Patent is hereby corrected as shown below:

Column 12, claim 1, line 52, the equation "523m+n$\leqq$100" should read --5$\leqq$m+n$\leqq$100--

Signed and Sealed this

First Day of July, 2008

JON W. DUDAS
*Director of the United States Patent and Trademark Office*